(12) United States Patent
Hsu et al.

(10) Patent No.: US 6,185,669 B1
(45) Date of Patent: Feb. 6, 2001

(54) SYSTEM FOR FETCHING MAPPED BRANCH TARGET INSTRUCTIONS OF OPTIMIZED CODE PLACED INTO A TRACE MEMORY

(75) Inventors: Wei C. Hsu; Manuel Benitez, both of Cupertino, CA (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/252,367

(22) Filed: Feb. 18, 1999

(51) Int. Cl.[7] ...................................................... G06F 15/00
(52) U.S. Cl. ...................... 712/205; 712/206; 712/207; 711/118; 711/119; 711/120; 711/137
(58) Field of Search .................................. 712/205, 206, 712/207; 711/118–120, 137

(56) References Cited

U.S. PATENT DOCUMENTS

| | | | |
|---|---|---|---|
| 5,764,885 | * | 6/1998 | Sites et al. ............................... 714/45 |
| 5,802,272 | * | 9/1998 | Sites et al. ............................... 714/45 |
| 5,909,578 | * | 6/1999 | Buzbee .................................. 395/704 |
| 6,018,786 | * | 1/2000 | Krick et al. ............................... 711/4 |
| 6,073,213 | * | 6/2000 | Peled et al. ........................... 711/125 |
| 6,076,144 | * | 6/2000 | Peled et al. ........................... 711/125 |

* cited by examiner

Primary Examiner—Meng-Ai T. An
Assistant Examiner—Nabil El-Hady

(57) ABSTRACT

The inventive mechanism uses a cache table to map branch targets. When a fetch instruction is initiated, the inventive mechanism searches the IP-to-TM cache to determine whether the branch target instruction has been optimized and placed into the trace memory. If there is a match with the IP-to-TM cache, then the code in the trace is executed. This cache is examined in parallel with Instruction Translation Lookup Buffer (ITLB). If not a match is found in the IP-to-TM cache, the original binary in the physical address provided by the ITLB will be executed.

14 Claims, 2 Drawing Sheets

SYSTEM FOR FETCHING MAPPED BRANCH TARGET INSTRUCTIONS OF OPTIMIZED CODE PLACED INTO A TRACE MEMORY

RELATED APPLICATIONS

Reference is made to the following co-pending and commonly assigned U.S. patent applications entitled FAST INSTRUCTION PROFILING AND EFFECTIVE TRACE SELECTION, application Ser. No. 09/252,567, filed on Feb. 18, 1999, which is hereby incorporated by reference, and SYSTEM AND METHOD USING A HARDWARE EMBEDDED RUN-TIME OPTIMIZER application Ser. No. 09/252,170, filed on Feb. 18, 1999, which is hereby incorporated by reference.

TECHNICAL FIELD OF THE INVENTION

This application relates in general to run-time optimizers, and in specific to hardware embedded run-time optimizers.

BACKGROUND OF THE INVENTION

A run-time optimizer is an adaptive software system that transparently optimizes applications at run-time. The optimizer rewrites the binary code of an application on-the-fly to achieve a higher execution efficiency.

FIG. 2 depicts prior art run time optimizer 20. The control loop 21 begins execution of a block of program code, via emulation performed by the profiling emulator 22. The profiling aspect of emulator 22 allows the control loop 21 to track the number of times the particular block of code has been executed via emulation. Note that a run time optimization system is different from a run time binary translation system, in that the latter is for architecture migration, while the former is to decrease execution time. The run time optimization system is using the emulator 22 for profiling in order to guide optimizations, i.e. the code is running on its native system. After a predetermined number of executions via emulation, the control loop 21 designates the block of code as hot code, and desirable for optimization. The control loop 21 then activates trace selector 23 to translate the block of code. The trace selector 23 forms a trace of the instructions that comprise the block of code by following the instructions in the block. When a branch instruction is encountered, the trace selector makes a prediction as to whether the branch is taken or falls through. If the selector decides the branch is mostly taken, then the trace is formed by extending the code from the branch target block. If the selector decides not to take the branch, then the branch falls through, and the trace continues within the fall through block. The trace terminates at a backward branch predicted to take or when the trace becomes sufficiently large. After the trace is completed, the code is rewritten with machine dependent and machine independent optimizations. The optimized code is then placed into the code cache 24. The next time the control loop 21 encounters a condition to execute this block of code, then the control loop 21 will execute the code in the code cache 24 and not emulate the code via emulator 22.

As shown in FIG. 3, if the target of a branch which is taken to exit trace 1, as shown by branch instruction 31, then control is returned to the run time system RTS 20 and to control loop 21, which determines if the target resides in the code cache. If the target resides in code cache, then the control loop 21 modifies the target of the branch instruction 31 to be the trace 2 in code cache as shown by branch instruction 33. This modification is called backpatching. Thus, if the exit of the trace is already translated, then the branch is backpatched such that a subsequent execution will directly branch to the new trace without returning to the control loop. Backpatching increases the speed of execution of the code, as returning to the RTS significantly slows down execution time.

A problem with the prior art RTS is that it cannot backpatch an indirect branch. The RTS cannot backpatch an indirect branch because the target address is unknown. The target address is typically in a register or memory location, and not written directly in code. Thus, the RTS will shift control back to the control loop 21 to determine whether the target address has been translated, which is expensive in terms of time. The prior art has attempted to minimize this problem by inlining a code sequence to search a smaller look up table in the optimized traces, however, these mechanism still incur high overhead. Moreover, if small table lookup fails then the RTS will shift control back to the control loop, as described above. Examples of indirect branches are return branches and switch branches. This software approach adds an additional 10–100s of cycles to the processing time.

Therefore, there is a need in the art for a RTS that can handle indirect branches without returning control to a control loop.

SUMMARY OF THE INVENTION

These and other objects, features and technical advantages are achieved by a system and method that uses a table to map branch targets that is built into the hardware as cache. Thus, when a fetch instruction is initiated, the IP-to-TM cache is examined to determine whether the branch target instruction has been optimized and placed into the trace memory. If there is a match with the IP-to-TM cache, then the code in the trace is executed.

The IP-to-TM cache is in the instruction fetch unit. This cache maps branch targets to optimized traces. This cache is examined in parallel with Instruction Translation Lookup Buffer (ITLB), if a match is found, the control will transfer to the optimized code. Otherwise, the execution control continues on the original code. This cache can significantly speed up the process of mapping a branch target to an optimized trace. Protection information will be included in the cache to enforce various protection needs typically served by ITLB.

The inventive mechanism eliminates the need to add a table look up to access separate pipeline stages, and thus increases the speed of the pipeline steps. This eliminates the need to use a software table look up and special handling of indirect branches.

When instructions are executed, the instructions typically have a virtual address. This virtual address needs to be translated into a physical memory address, particularly when assessing caches like the instruction cache or data cache. This translation is usually done by the ITLB. Thus, every time an instruction needs to be fetched, the ITLB needs to be examined. The inventive mechanism uses this requirement to perform a parallel lookup in the IP-to-TM cache.

The inventive mechanism first determines if the target address is a trace address, if so then the IP-to-TM cache does not need to be examined, and the instruction can be fetched directly from the trace memory. If the target address is virtual address in original code address, then the mechanism examines both the IP-to-TM cache and ITLB. If the address matches an entry in the IP-to-TM cache, then the instruction is fetched from trace memory. Note that if the IP-to-TM cache hits, then the ITLB should also hit, however, the ITLB hit is ignored. If the IP-to-TM cache misses, and the ITLB hits, then the instruction is fetched from original code and executed from there. If both the IP-to-TM cache and ITLB miss, then the mechanism invokes a hardware walker to load the correct translation into the ITLB.

Therefore, it is a technical advantage of the present invention to have the mapping from a branch to a trace stored in the IP-to-TM cache that is embedded into the hardware.

It is further technical advantage of the present invention that the IP-to-TM cache handles indirect branches much more efficiently than a software approach.

It is a further technical advantage of the present invention that the IP-to-TM cache and the ITLB are examined in parallel.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The inventive mechanism is incorporated into a run-time optimization system (RTOS) that is embedded in hardware. The RTOS is discussed further in SYSTEM AND METHOD USING A HARDWARE EMBEDDED RUN-TIME OPTIMIZER application Ser. No. 09/252,170, filed on Feb. 18, 1999, which is hereby incorporated by reference. RTOS has the control of the optimization in hardware and hardware is used to detect hot code, as well as execute both optimized and non-optimized code. Hardware also notifies the firmware via traps. The RTOS uses firmware to handle trace selection, code optimization, and trace memory management, each of which require complex analysis.

The RTOS uses the trace memory (TM) to hold the traces of the optimized instructions. Trace selection is discussed in FAST INSTRUCTION PROFILING AND EFFECTIVE TRACE SELECTION application Ser. No. 09/252,567, filed on Feb. 18, 1999, which is hereby incorporated by reference. Note that trace memory is a portion of RAM memory. RAM also includes IP-to-TM mapping table. This table lists the mapping of the original IP of a trace to the location in the TM which corresponds to the optimized trace. The RTOS uses IP-to-TM cache, which is a TLB-like structure in the instruction fetch unit to accelerate mapping table access. The IP-to-TM cache holds a smaller portion of the most active entries in the IP-to-TM mapping table. Thus, the IP-to-TM cache contains a list of mapping entries 112 that correlate virtual IP addresses with trace memory addresses. Note that trace memory is part of the physical memory.

Figure 1:
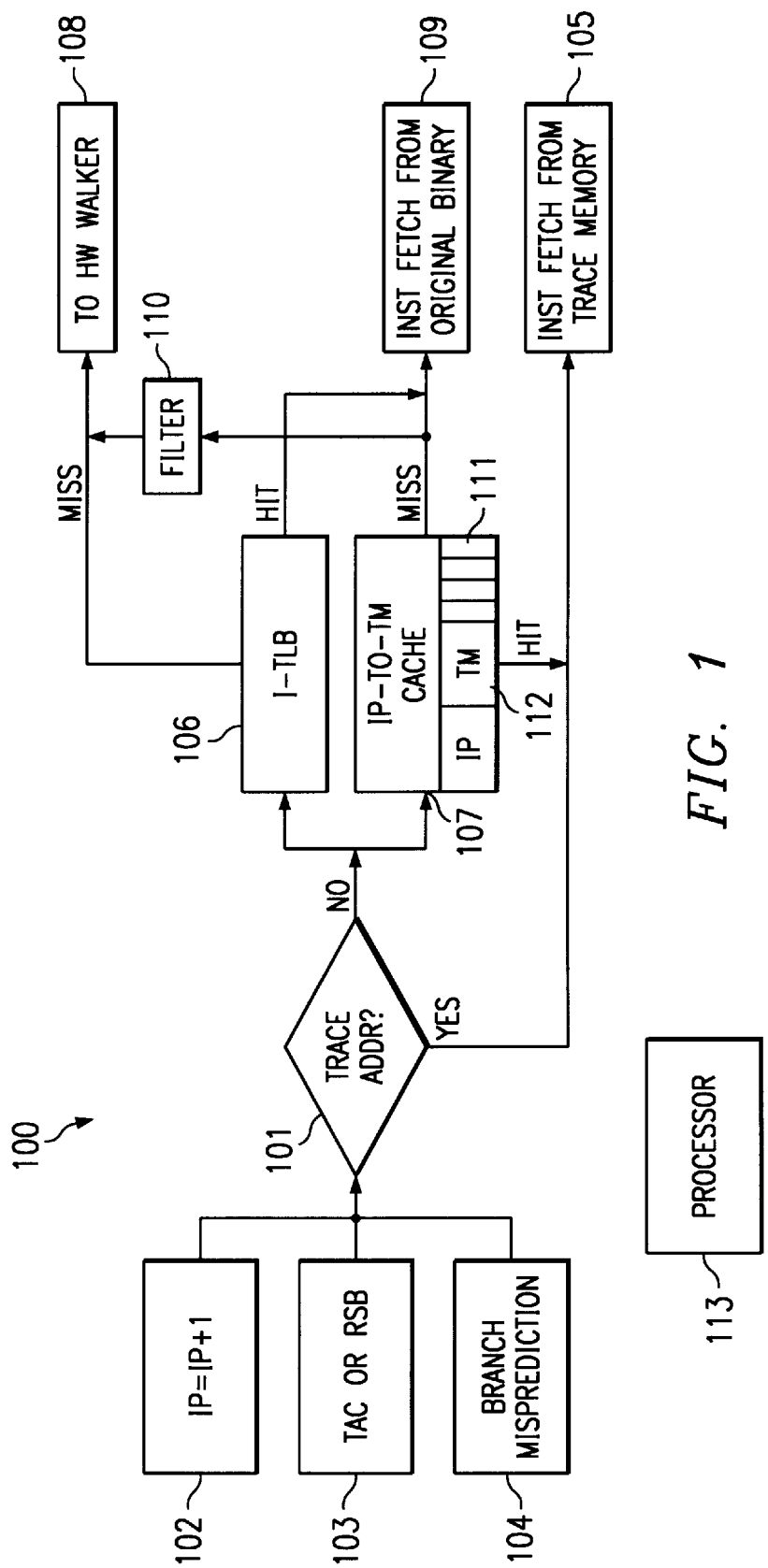
FIG. 1 depicts the flow of operation of the inventive IP-to-TM cache.
Figure 2:
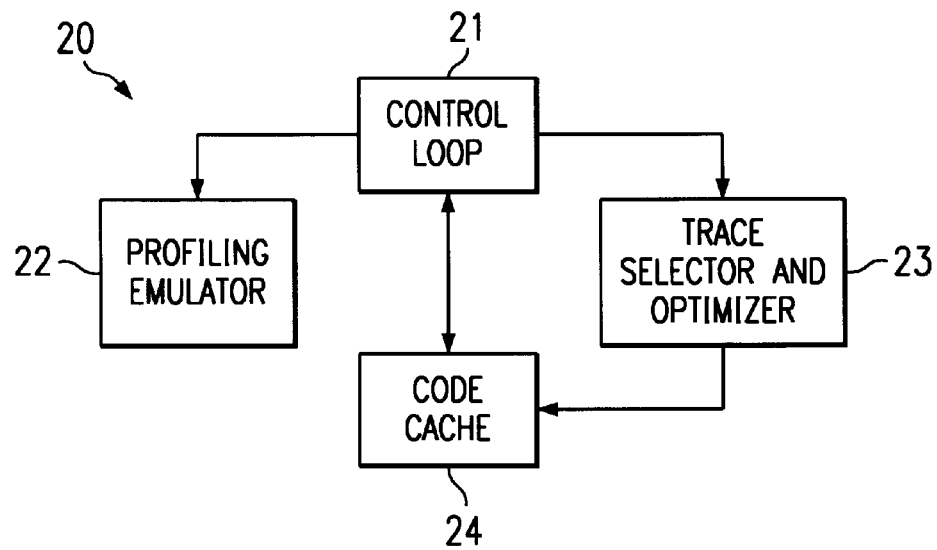
FIG. 2 depicts prior art run time optimizer.
Figure 3:
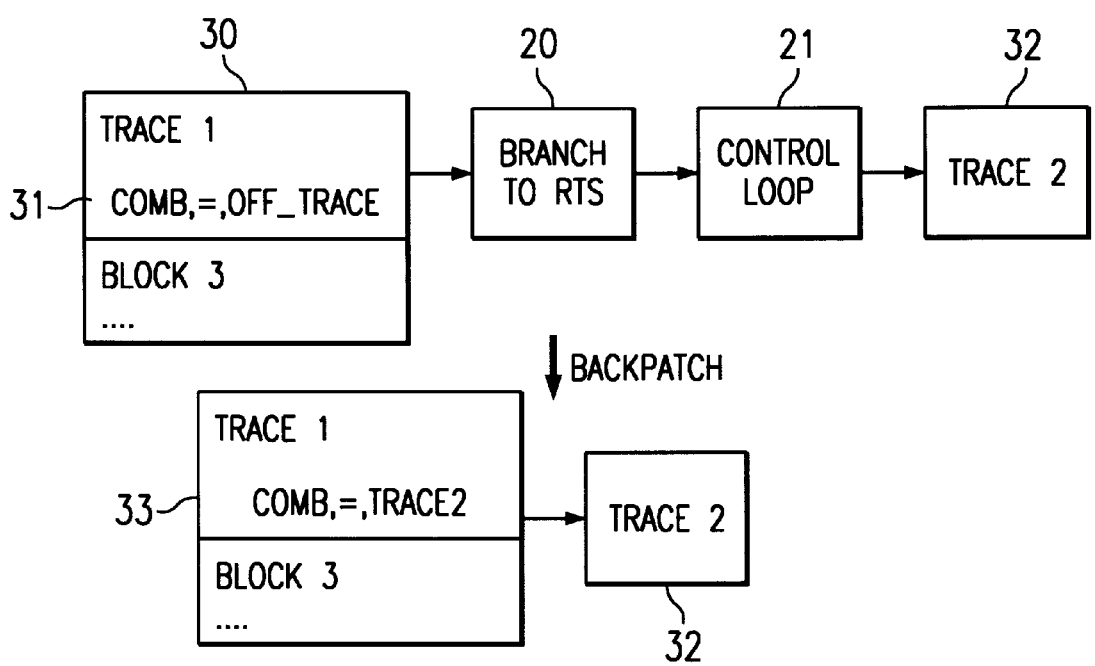
FIG. 3 depicts a prior art backpatching mechanism used with the system of FIG. 2.

As shown in FIG. 1, the instruction pointer (IP), which references an instruction in the user application (not shown) and indicates that a particular instruction is to be executed. The pointer may arise from several sources, including being the target of a branch instruction. In the instruction fetch stage, a fetch address or IP can be calculated from fall-through address 101 such as current-IP+1-line or current-TM+1-line. The IP address may represent a predicted taken branch target address 102 in Target Address Cache (TAC) or Return Stack Buffer (RSB). The TAC and the RSB are the hardware target address prediction structures, which predict the location of the next fetch target. The IP address may also be a target address forwarded from a mis-predicted branch 103 detected at the end of execution stage. Note that all virtual addresses will access the IP-to-TM cache. The I-cache access takes two steps: (a) indexing and (b) tag match. Indexing is usually based on virtual address but tags use physical address. So tag matching can only be performed after ITLB access.

After receiving the fetch address, the Instruction Fetch Unit (IFU) of the processor 113 first determines whether the address is a trace address. A trace address indicates that the instruction is a starting location of a block which has been optimized and resides in trace memory. If it is a trace address, the IFU then retrieves 105 the optimized instruction in trace memory, for executing. Note that a trace address has an additional bit to distinguish it from a physical address or virtual address. Note that a virtual address must be mapped into a physical address.

If the fetch IP address is not a trace address, but rather is a virtual address or a physical address, then the IFU performs a parallel lookup of the ITLB 106 and the IP-to-TM cache 107. If the fetch address matches an address in the IP-to-TM cache 107, in other words there is an IP-to-TM cache hit, then the IFU uses the trace address associated with the matched IP address to retrieve and execute the optimized instruction in trace memory. In other words, the IP-to-TM cache provides the trace address to be used by the fetch unit of the processor. Note that the ITLB will most likely also hit, however this hit is ignored by the processor in favor of the IP-to-TM cache hit. Also note that instructions are always executed from I-cache, no matter if it is from physical memory or from trace memory.

An address miss in the IP-to-TM cache and an address match or hit in the ITLB 106 will cause the fetch unit of the processor to fetch the instruction from the original binary 109. Note that a hit in the ITLB 106 indicates that the virtual address can be properly translated into a physical address. After determining the proper physical address, the processor then searches the I-cache (not shown) to see if the instruction has already been loaded into I-cache. If so, then the processor executes the instruction, otherwise the processor then fetches the instruction from the preserved memory or RAM location indicated by the physical address, loads the instruction into the I-cache, and then executes the instruction.

An address miss in the IP-to-TM cache with a corresponding an address match or hit in the ITLB 106 will also cause the hardware walker 108 to be invoked. The hardware walker then searches the larger IP-to-TM mapping table that is maintained in the preserved memory. Note that the hardware walker understands the structure of the table. If the hardware walker (HW) locates such an address in the table, then it copies the entry into the IP-to-TM cache. Note that the HW is part of the processor. Thus, subsequent fetches of the instruction will be retrieved from the trace memory. However, the current fetch is from the original binary. Note that this is one way of adding entries to the IP-to-TM cache. An IP-to-TM entry may also be added to the cache (as well as the table) when a trace is optimized and written to the trace memory. Cache entries that are infrequently used will be replaced with newer entries. However, the translation will remain in trace memory and the entry will remain in the IP-to-TM mapping table.

Note that some code sequences do not have translations. The code may not be translated because the code is not hot enough or is too difficult to translate. Thus, to prevent repetitive hardware walker invocations, a filter 110 used to store addresses that have been previously searched in the IP-to-TM table by the hardware walker and resulted in misses. When a code sequence is translated, the filter is searched and any address included in the sequence is removed from the filter.

Note that some processors do not have a hardware walker, and thus an alternative is needed. One alternative is to insert an IP-to-TM entry into the IP-to-TM cache directly when a trace is generated. A miss in the IP-to-TM cache will cause the execution back to the original binary. When an IP-to-TM entry is removed from the IP-to-TM cache, the trap handler could reset the threshold of the original I-cache line, so it would eventually cause a trap to regenerate the trace if it is frequently executed.

A miss in the ITLB will also cause the invocation of the hardware walker. In this case, the hardware walker is used to examine the page table to determine the physical location that matches the virtual location. If the processor does not have a hardware walker, software can perform this function. Note that the IP-to-TM table has a similar structure to the page table, and thus the hardware walker is able to search both. Upon locating the physical location, the hardware walker (or software) inserts the entry into the ITLB. If the hardware walker cannot located the address in the page table, then the walker traps to software trap handler.

The IP-to-TM cache also operates like ITLB in that it also checks for access rights and protections 111. The ITLB protects the virtual memory system. Each memory page may have different access rights. These protections need to be carried into trace operations. At the time an IP-to-TM entry is created, important protection information is copied from the ITLB entry into the IP-to-TM entry 111. Thus, before access is granted to a particular trace, the request must meet the access rights as described by protection information 111. One difference between the regular ITLB and the IP-to-TM cache is that ITLB uses page addresses as input, while IP-to-TM cache uses bundle addresses as input. Since a trace can cross pages, the trace selector must make sure that the protection requirements are the same for all pages the trace is selected from, before it grows a trace that crosses pages. Alternatively, the difference in the access rights may be reconciled before building the trace. One method for reconciliation is to select the highest protection requirement of the pages of the trace, and assign that access requirement for the trace. Alternatively, the lowest requirement of the pages of the trace may be used. An example of a protection would be a limitation that states that the instructions on a particular page cannot be speculated.

Although the present invention and its advantages have been described in detail, it should be understood that various changes, substitutions and alterations can be made herein without departing from the spirit and scope of the invention as defined by the appended claims.

What is claimed is:

1. A hardware system for fetching an instruction for execution that corresponds to an instruction pointer in a program, wherein the program has at least one portion expressed in a first code and at least one portion expressed in a second code wherein the second code is comprised of instructions that has been optimized, the system comprising:

a first memory portion for holding the first code;

a second memory portion for holding the second code;

a third memory portion for holding an active portion of a mapping of instruction pointers to addresses of instructions of the second code in the second memory portion;

a fourth memory portion that holds a mapping of instruction pointers to addresses of instructions of the first code in the first memory position; and a processor sub-unit for determining whether the instruction pointer is an address in the second memory portion;

wherein if the instruction pointer is an address in the second memory portion, the processor sub-unit fetches the instruction in the second code corresponding to the address in the second memory portion for execution; and wherein if the instruction pointer is not an address in the second memory portion, the processor sub-unit performs a parallel search of the third memory portion to determine whether the instruction pointer has a mapping to a corresponding instruction in the second code, and the fourth memory portion to determine whether the instruction pointer has a mapping to a corresponding instruction in the first memory portion, wherein an address match in the fourth memory portion is ignored in favor of an address match in the third memory portion, if the instruction pointer has a mapping in the third memory portion, then the processor sub-unit fetches the instruction in the second code corresponding to the address in the second memory portion for execution, and if the instruction pointer does not have a mapping in the third memory portion, then the processor sub-unit fetches the instruction in the first code corresponding to the instruction pointer for execution.

2. The system of claim 1, wherein:

the first and second memory portions are portions of a preserved physical memory; and the third memory portion is a cache.

3. The system of claim 1, wherein:

the processor sub-unit is an instruction fetch unit.

4. The system of claim 1, wherein the third memory portion is a cache that hold an active portion of the mapping of instruction pointers to addresses of instructions of the second code, the system further comprising:

a fifth memory portion that holds a substantially complete mapping of instruction pointers to addresses of instructions of the second code; and a hardware walker for searching the fifth memory portion to determine if the instruction pointer has a mapping to a corresponding instruction in the second code;

wherein if the instruction pointer does not have a mapping to a corresponding instruction in the second code in the third memory portion, then the hardware walker is invoked to search the fifth memory portion;

wherein if the fifth memory has mapping for the instruction pointer, then the hardware walker copies the mapping entry into the third memory portion.

5. The system of claim 4, wherein:
the copied mapping entry replaces an infrequently used entry in the third memory portion.

6. The system of claim 4, further comprising:
a filter that stores instruction pointers that have been previously searched for by the hardware walker and resulted in locating no corresponding instructions in the second code in the fifth memory portion;
wherein the filter prevents repetitive invocations of the hardware walker by blocking invocations of the hardware walker to search for instruction pointers that are stored therein.

7. The system of claim 1, the system further comprising:
a page table that holds a substantially complete mapping of instruction pointers to addresses of instructions of the first code; and
a hardware walker for searching the page table to determine if the instruction pointer has a mapping to a corresponding instruction in the first code;
wherein if the fourth memory portion does not include a mapping of the instruction pointer to a corresponding address of the first code in the first memory, then the hardware walker is invoked to search the page table;
wherein if the page table has a mapping for the instruction pointer, then the hardware walker copies the mapping entry into the fourth memory portion.

8. A method using a hardware system for fetching an instruction for execution that corresponds to an instruction pointer in a program, wherein the program has at least one portion expressed in a first code and at least one portion expressed in a second code wherein the second code is comprised of instructions that has been optimized, the system includes a first memory portion for holding the first code, a second memory portion for holding the second code, a third memory portion for holding an active portion of a mapping of instruction pointers to addresses of instructions of the second code in the second memory portion, and a fourth memory portion that holds a mapping of instruction pointers to addresses of instructions of the first code in the first memory portion, the method comprising the steps of:
determining whether the instruction pointer is an address in the second memory portion via a processor sub-unit;
fetching the instruction in the second code corresponding to the address in the second memory portion for execution, via the processor sub-unit, if the instruction pointer is an address in the second memory portion;
performing, via the processor sub-unit, a parallel search of the third memory portion to determine whether the instruction pointer has a mapping to a corresponding instruction in the second code, and the fourth memory portion to determine whether the instruction pointer has a mapping to a corresponding instruction in the first memory portion, if the instruction pointer is not an address in the second memory portion, wherein an address match in the fourth memory portion is ignored in favor of an address match in the third memory portion;
fetching the instruction in the second code corresponding to the address in the second memory portion for execution, via the processor sub-unit, if the instruction pointer has a mapping in the third memory portion; and
fetching the instruction in the first code corresponding to the instruction pointer for execution, via the processor sub-unit, if the instruction pointer does not have a mapping in the third memory portion.

9. The method of claim 8, wherein the first and second memory portions are portions of a preserved physical memory, and the third memory portion is a cache.

10. The method of claim 8, wherein the processor sub-unit is an instruction fetch unit.

11. The method of claim 8, wherein the third memory portion is a cache that hold an active portion of the mapping of instruction pointers to addresses of instructions of the second code, and the system further includes a fifth memory portion that holds a substantially complete mapping of instruction pointers to addresses of instructions of the second code, the method further comprising the steps of:
searching the fifth memory portion to determine if the instruction pointer has a mapping to a corresponding instruction in the second code, via a hardware walker, if the instruction pointer does not have a mapping to a corresponding instruction in the second code in the third memory portion; and
copying the mapping entry into the third memory portion, via the hardware walker, if the fifth memory has mapping for the instruction pointer.

12. The method of claim 11, wherein the step of copying comprises the step of:
replacing an infrequently used entry in the third memory portion with the copied mapping entry.

13. The method of claim 11, further comprising the steps of:
storing, in a filter, instruction pointers that have been previously searched for by the hardware walker and resulted in locating no corresponding instructions in the second code in the fifth memory portion; and
blocking invocations of the hardware walker to search for instruction pointers that are stored in the filter.

14. The method of claim 8, the system further includes a page table that holds a substantially complete mapping of instruction pointers to addresses of instructions of the first code, the method further comprising the steps of:
searching the page table to determine if the instruction pointer has a mapping to a corresponding instruction in the first code, via a hardware walker, if the fourth memory portion does not include a mapping of the instruction pointer to a corresponding address of the first code in the first memory; and
copying the mapping entry into the fourth memory portion, via the hardware walker, if the page table has a mapping for the instruction pointer.

\* \* \* \* \*